April 21, 1925.

D. M. GRAHAM

HARVESTER AND STACKER

Filed May 10, 1917   11 Sheets-Sheet 1

1,534,111

April 21, 1925.

D. M. GRAHAM

HARVESTER AND STACKER

Filed May 10, 1917   11 Sheets-Sheet 2

Inventor
D. M. Graham,
By
N. N. Bliss
Attorney

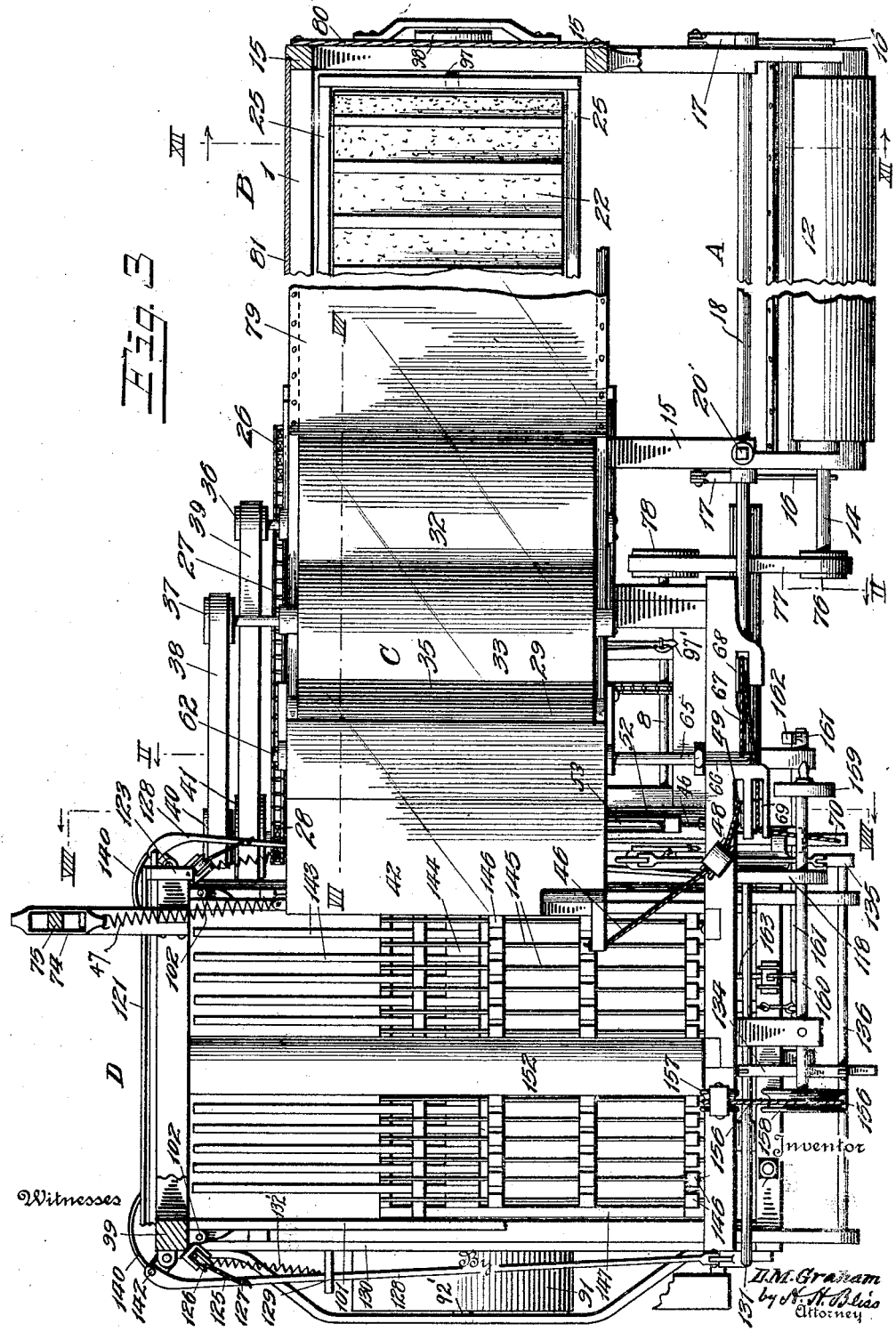

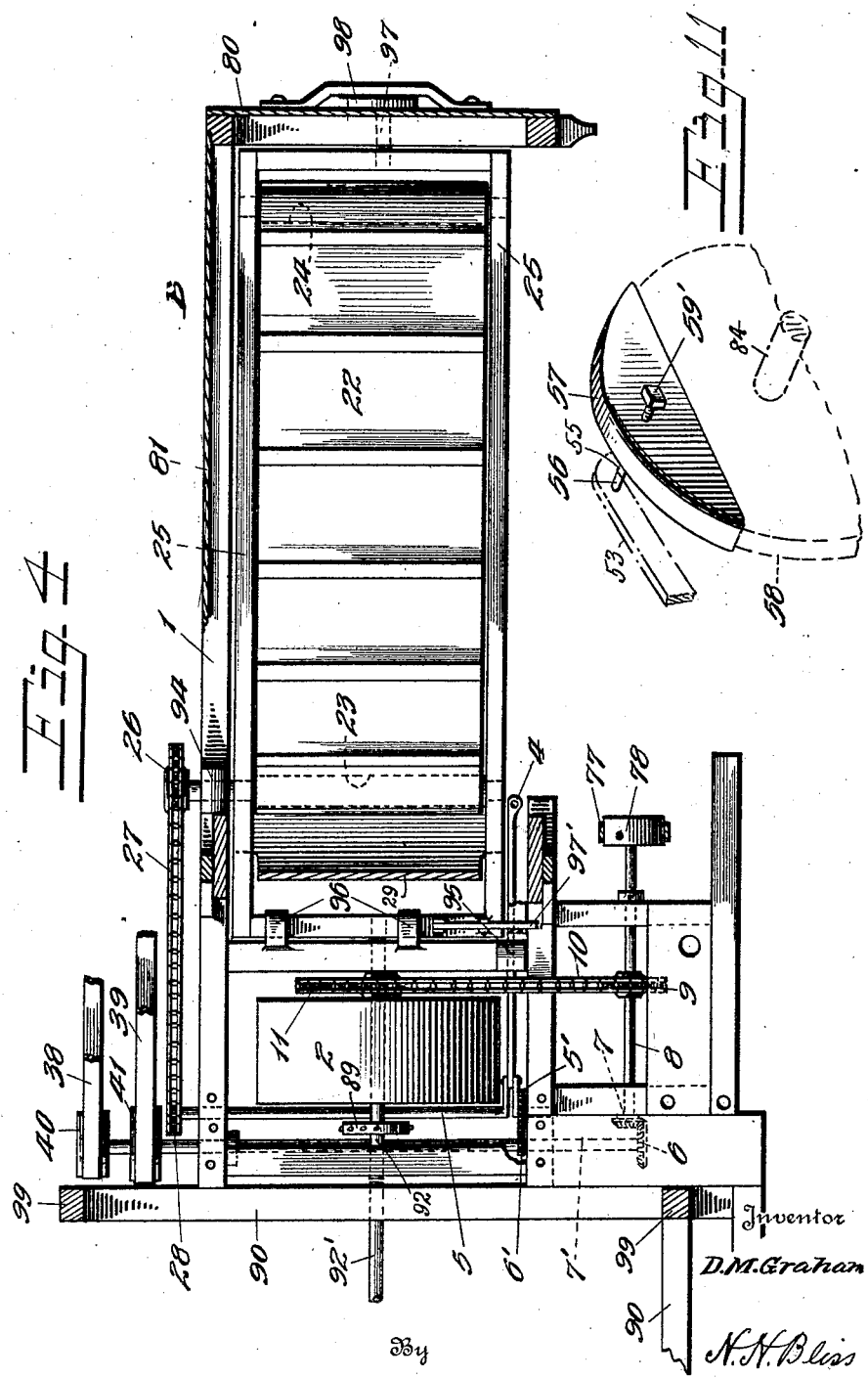

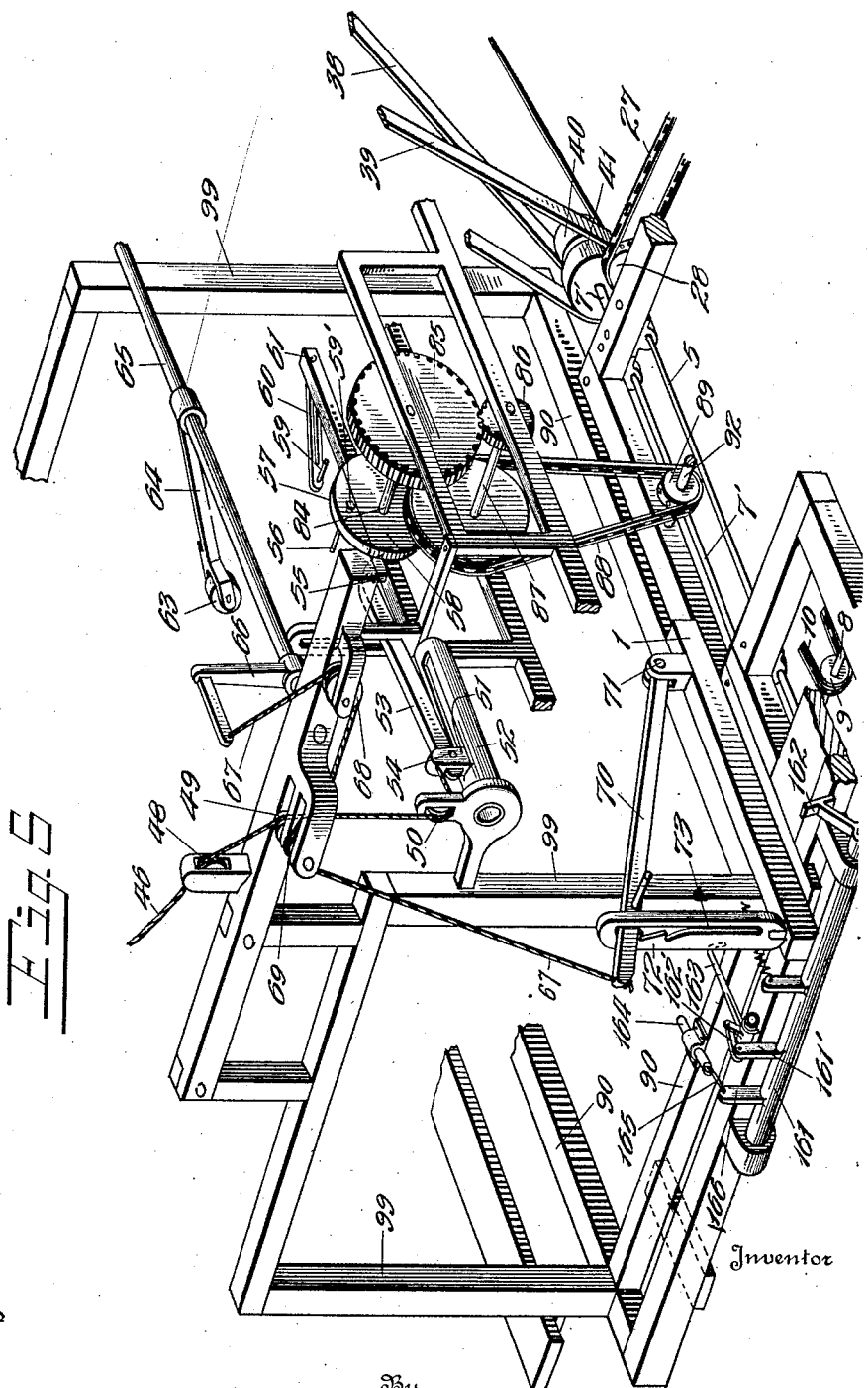

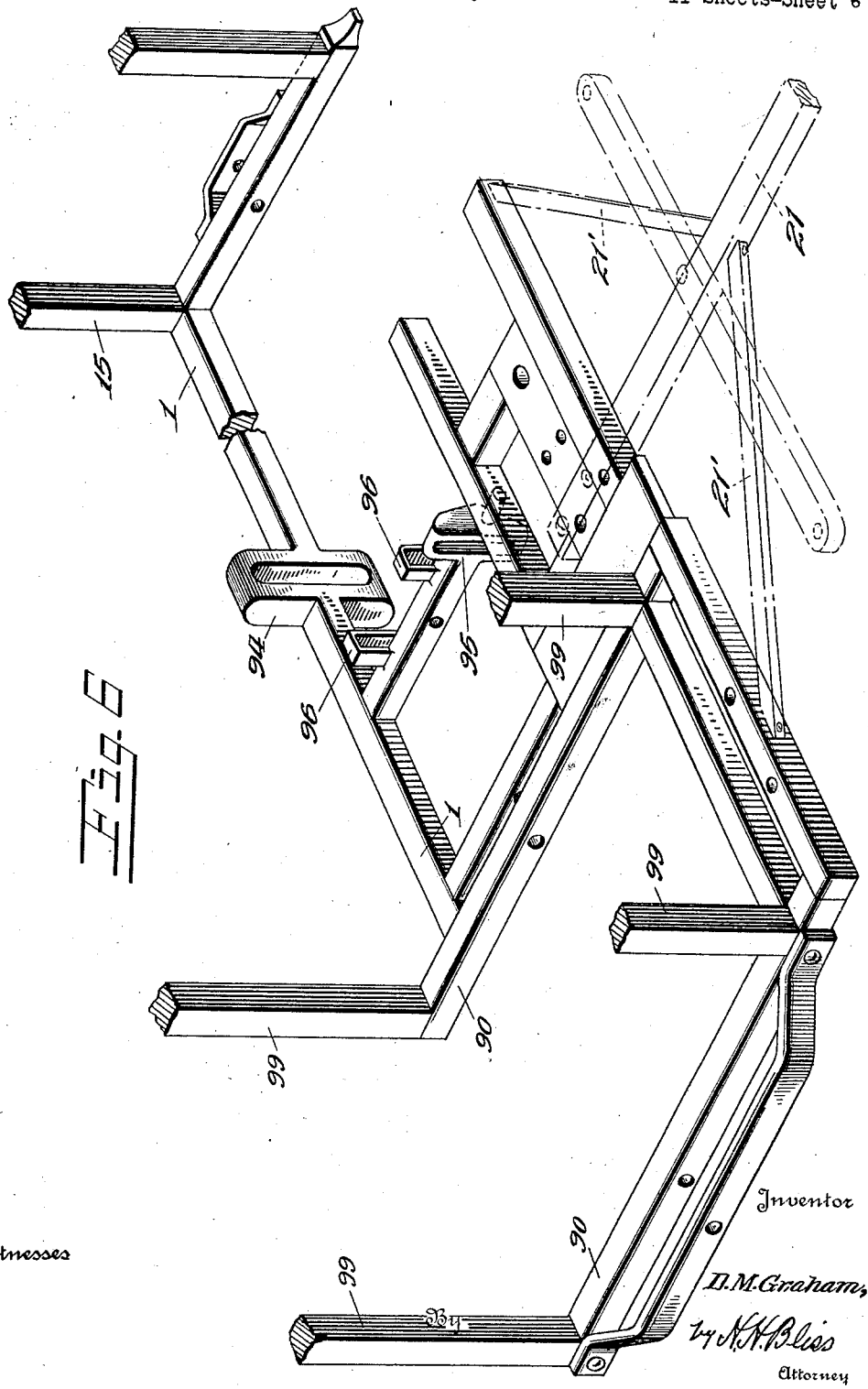

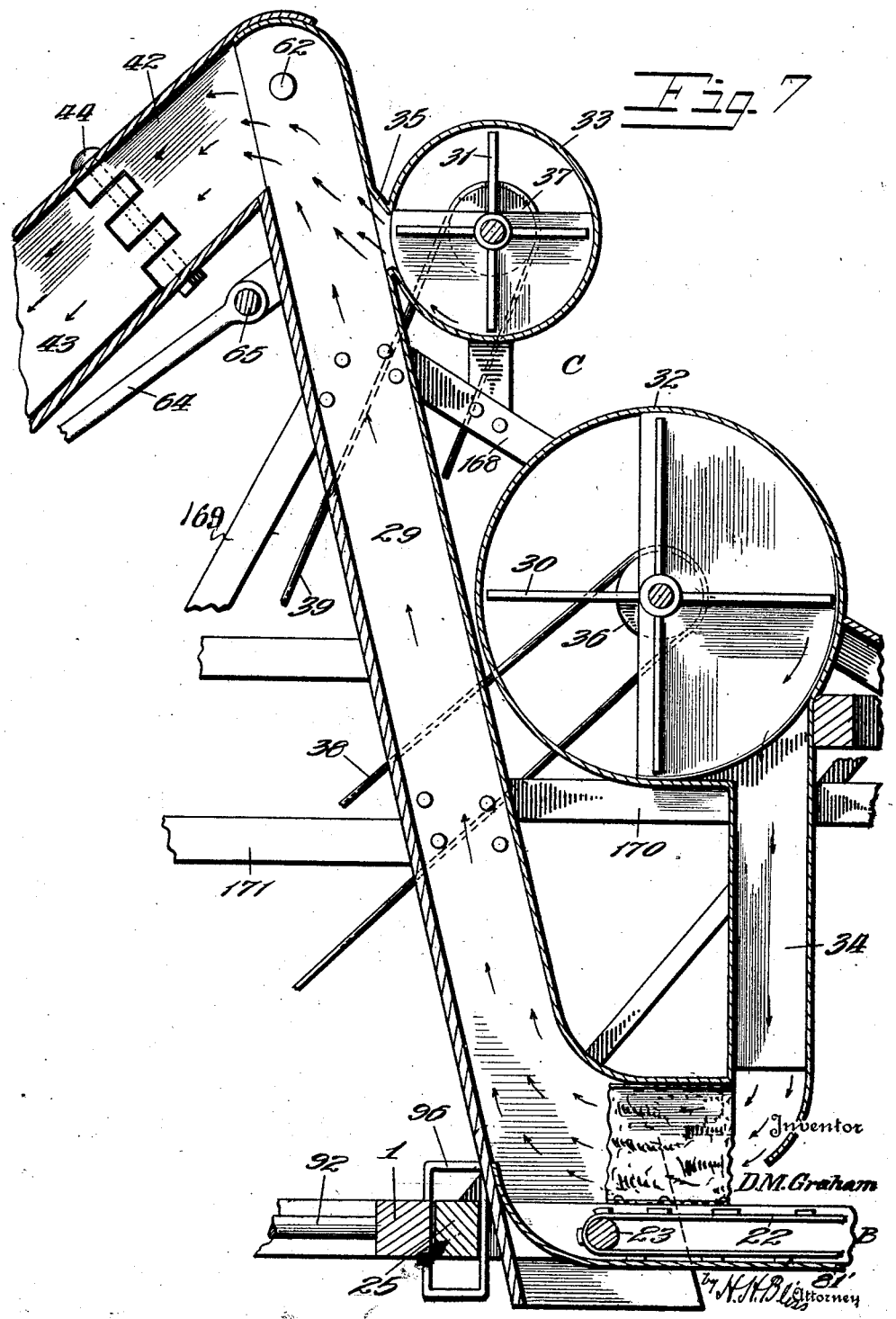

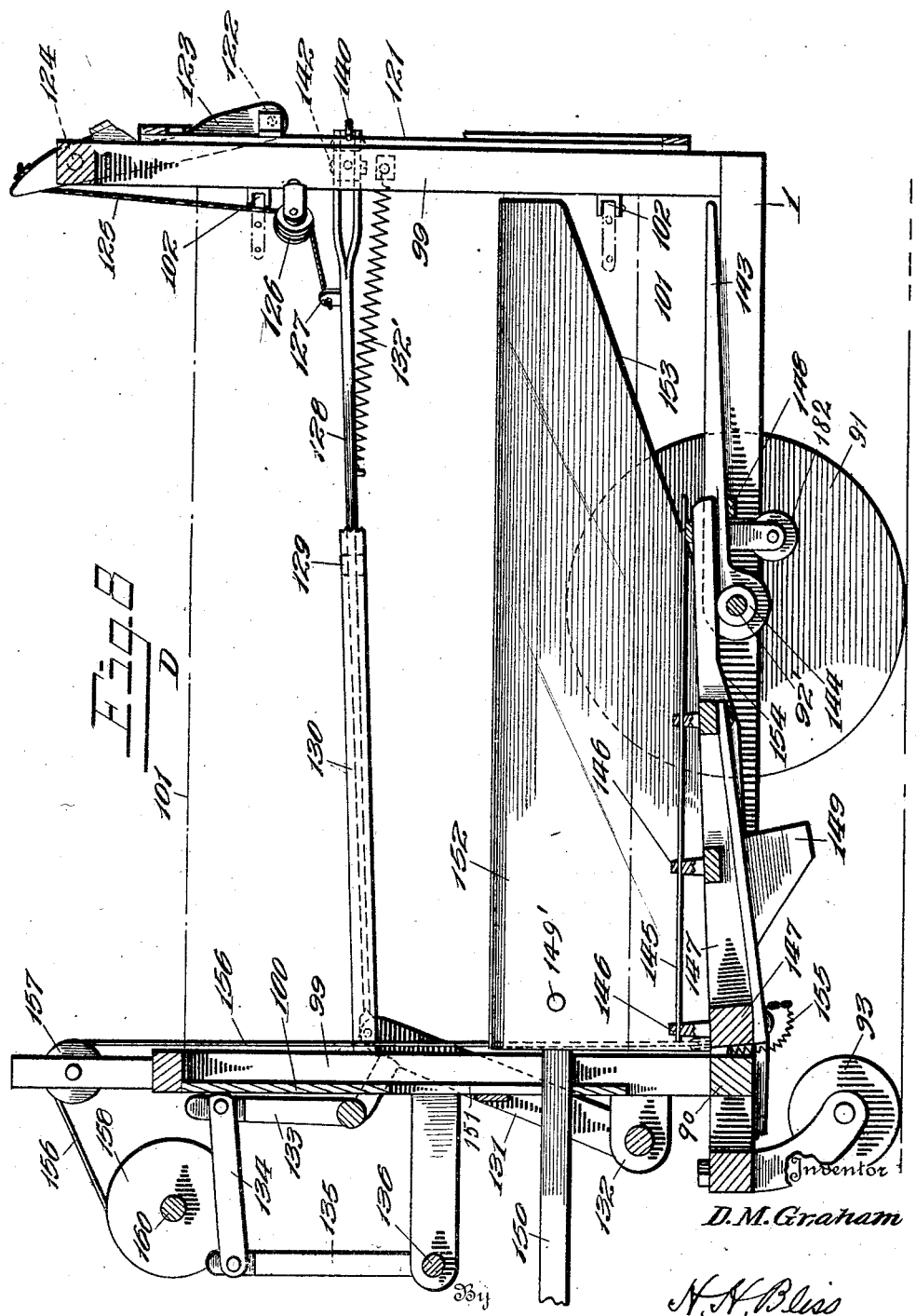

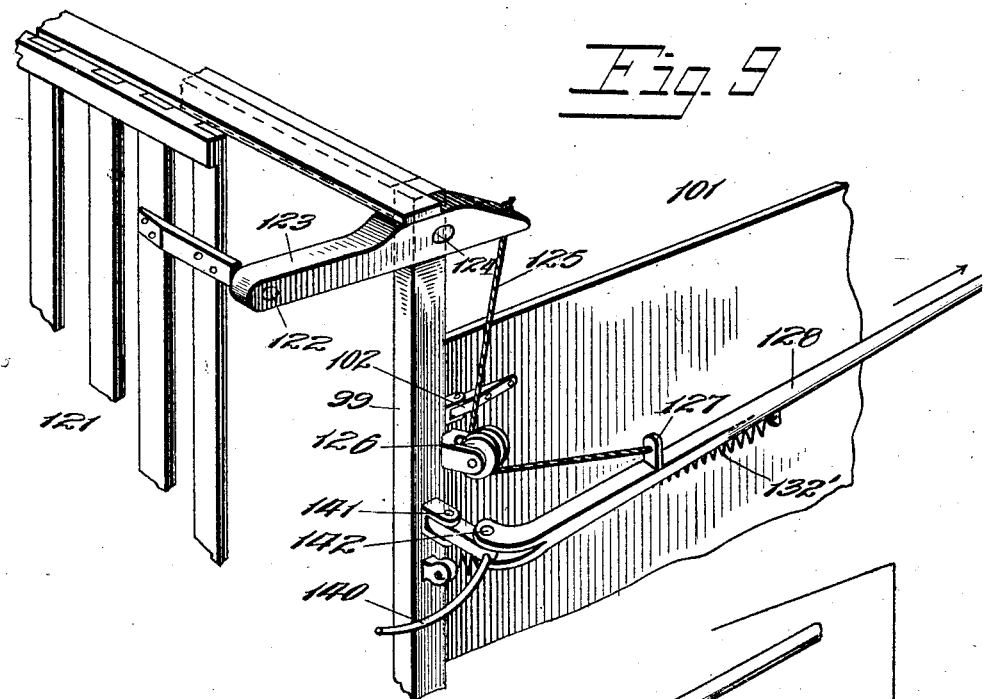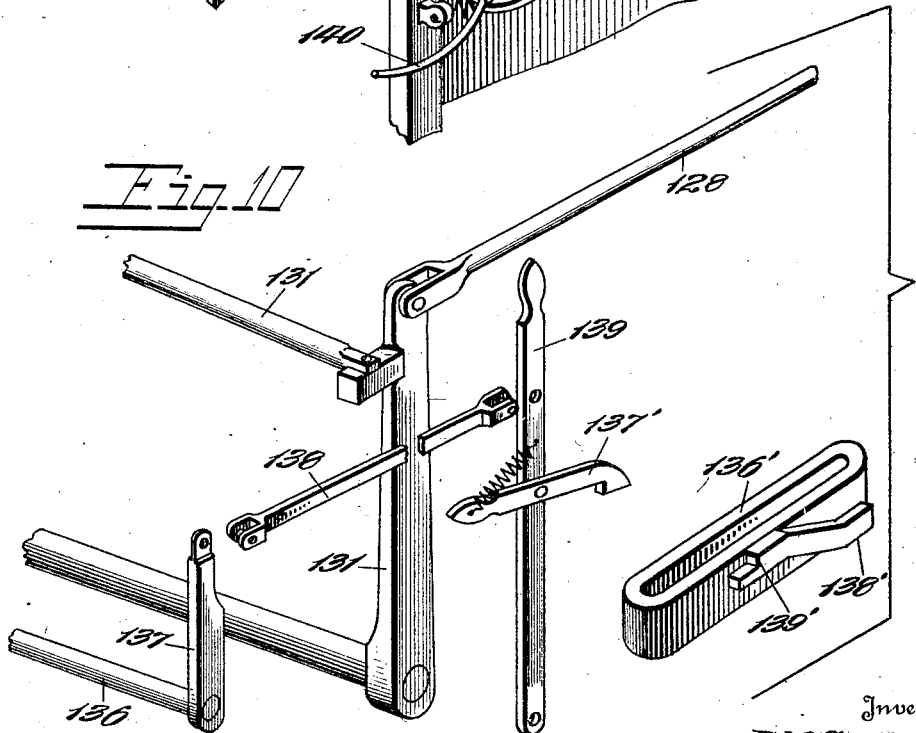

April 21, 1925.
D. M. GRAHAM
HARVESTER AND STACKER
Filed May 10, 1917
1,534,111
11 Sheets-Sheet 10
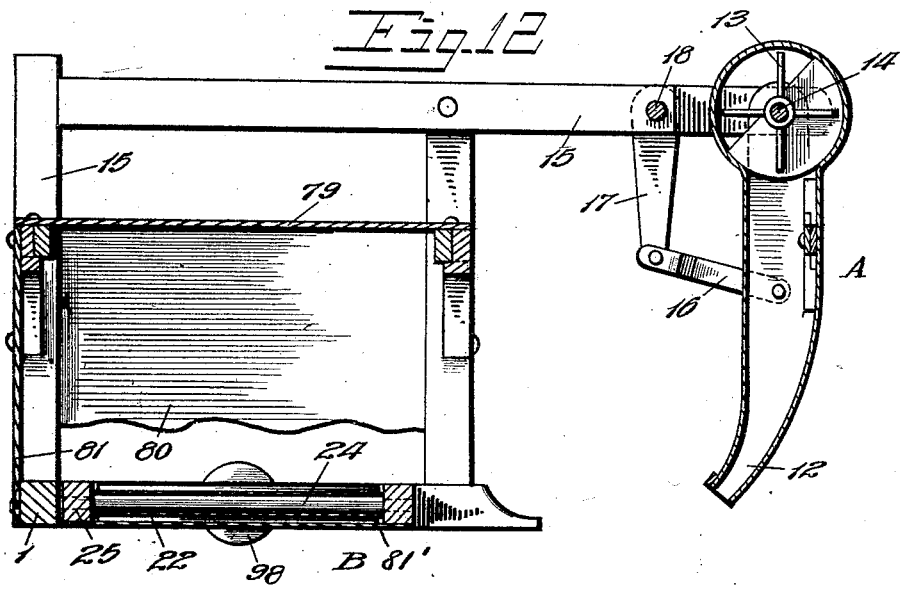
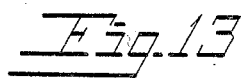
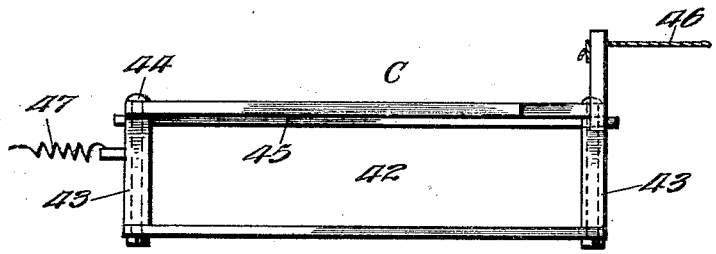
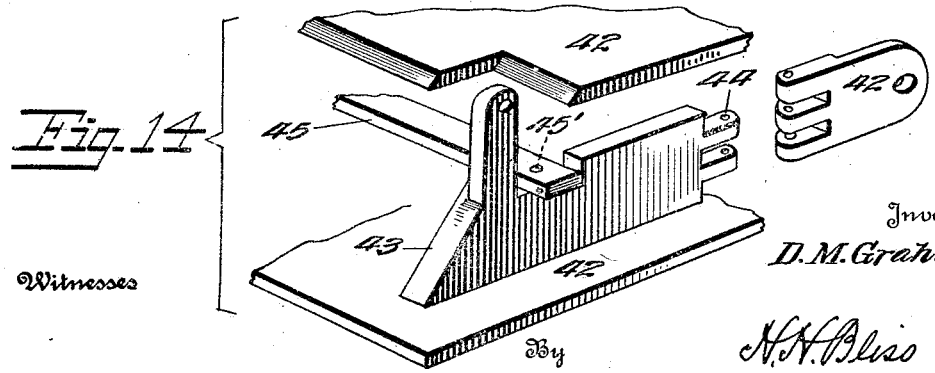

April 21, 1925.
D. M. GRAHAM
HARVESTER AND STACKER
Filed May 10, 1917
1,534,111
11 Sheets-Sheet 11
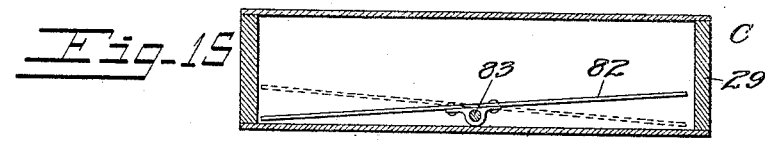
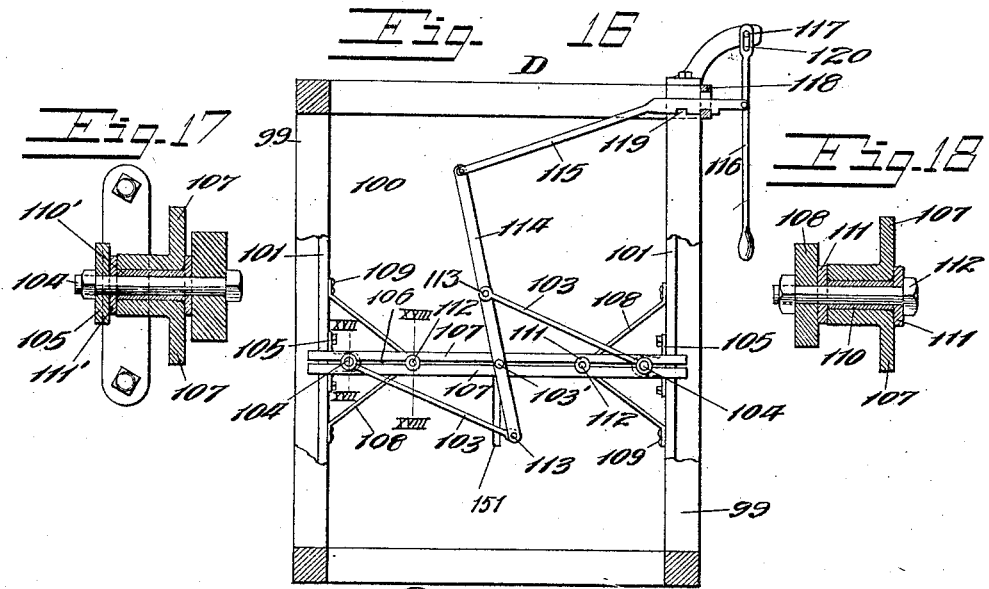
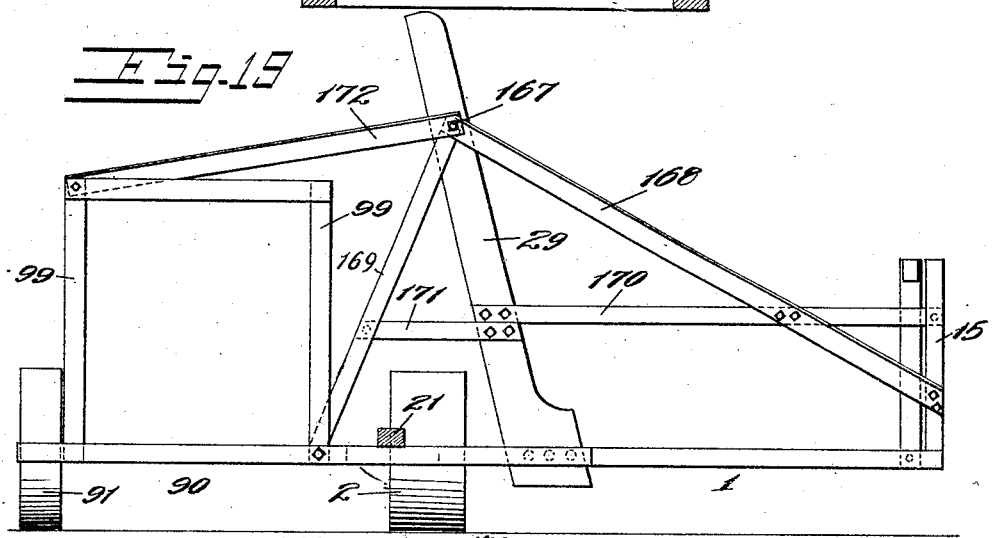
Inventor
D. M. Graham,
By N. N. Bliss
Attorney Patented Apr. 21, 1925.

1,534,111

UNITED STATES PATENT OFFICE.

DAVID M. GRAHAM, OF BORDULAC, NORTH DAKOTA.

HARVESTER AND STACKER.

Application filed May 10, 1917. Serial No. 167,726.

*To all whom it may concern:*

Be it known that I, DAVID M. GRAHAM, a citizen of the United States, residing at Bordulac, in the county of Foster and State of North Dakota, have invented certain new and useful Improvements in Harvesters and Stackers, of which the following is a specification, reference being had therein to the accompanying drawing.

The invention relates to an apparatus for the cutting, harvesting, stacking, drying and curing of grain or the like, and consists in the parts and combinations thereof herein set forth and claimed.

Among the objects and advantages of the invention are the saving of time and labor in cutting and handling the grain preparatory to threshing; the better drying and curing of the grain in loose form as distinguished from bound form; the saving of the expense incident to the binding system including cost of machinery and breakage or failure in operation of the same, with consequent loss of valuable time in the limited harvesting season; repairs of binding machinery; the cost of binding twine; the loss of grain rattled out from the grain heads by such machinery and in handling the bundles after binding; the further saving of labor and time in gathering up widely scattered bundles or small shocks, and also of time with respect to the occupation of the land by widely distributed harvested grain which delays the preparation of the land for the next crop; and, in general, the substitution for all of these operations of machinery which is relatively simple and inexpensive, requiring few and simple repairs, and which is nevertheless efficient in operation in place of the more complicated and expensive machinery heretofore in general use. In addition to these considerations is the material improvement in the grain berries, in weight, grade and value, which is of the greatest importance.

With such objects in view, as well as other advantages which may be incident to the use of the improvements, the invention consists in the parts and combinations thereof hereinafter set forth and claimed, with the understanding that the several necessary elements constituting the same may be varied in proportions and arrangement without departing from the nature and scope of the invention.

In order to make the invention more clearly understood there are shown in the accompanying drawings means for carrying the same into practical effect, without limiting the improvements, in their useful application, to the particular constructions which, for the purpose of explanation, have been made the subject of illustration. In the said drawings:—

Fig. 3 is a plan view of the machine.

Fig. 4 is a plan view of the lower part of the near side, or harvesting portion, of the machine, certain of the parts being shown in horizontal section.

Fig. 5 is a perspective view of a portion of the stacker, looking from the front near corner of the machine.

Fig. 6 is a perspective view of the base frame looking from the front off corner of the machine.

Fig. 7 is a vertical section, on a larger scale, on line VII—VII of Fig. 3, showing also a modification comprising a movable wall within the trunk.

Fig. 8 is a vertical longitudinal section on line VIII—VIII of Fig. 3.

Fig. 9 is a perspective view of a portion of the stack former illustrating the end gate controlling mechanism.

Fig. 10 is a perspective view of another part of said mechanism looking towards the front near corner of the stack former.

Fig. 11 is a perspective view of a detail of the distributing mechanism.

Fig. 12 is a vertical longitudinal section of the harvesting devices on line XII—XII of Fig. 3.

Fig. 13 is a view looking into the delivery end of the grain distributing device.

Fig. 14 is a perspective view illustrating the same, with some of the parts separated.

Fig. 15 is a horizontal section of the elevator trunk showing a modification.

Fig. 16 is a front end view of the stack former, partly broken away, showing means for operating the side walls, which parts are omitted from Fig. 1 to avoid complication.

Figs. 17 and 18 are sections, on a larger scale, on lines XVII—XVII and XVIII—XVIII, respectively, of Fig. 16.

Fig. 19 is a front view of the machine to illustrate the supporting framing and main ground wheels.

Fig. 20 is a plan view showing a modification illustrating a laterally adjustable draft appliance which may be applied to the machine.

Figure 1:
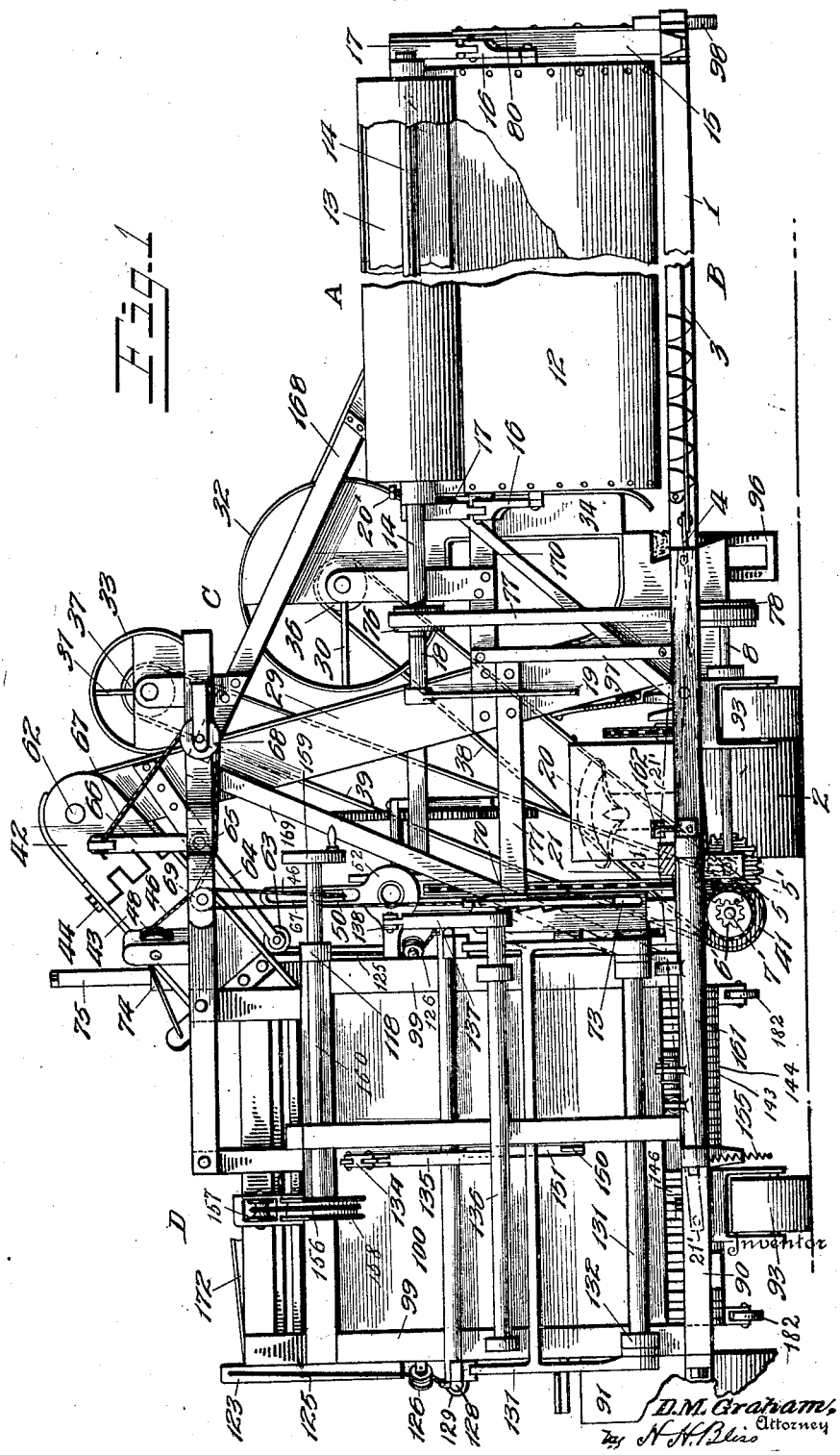
Fig. 1 is a front elevation of a harvesting and stacking mechanism comprising parts which embody the invention in its preferred form, a section of the harvesting elements being broken away.

Referring to the drawings, which are typical and more or less conventional in character, the mechanism illustrated comprises pneumatic means A for bending the grain or grass towards the cutter at the time of cutting, cutting and grain receiving means B, pneumatic grain elevating means C, and stack forming and depositing means D. 1 is the frame of the harvesting mechanism carried by the bull wheel 2 and having at its front a harvesting cutter 3 (Fig. 1) actuated by a pitman 4, crank shaft 5, gear wheel 5', pinion 6', shaft 7', bevel pinions 6, and 7, shaft 8, sprocket 9, chain 10 and sprocket 11 connected with the bull wheel. The standing grain or grass is bent toward the front of the harvesting platform by an air blast from a casing 12 (Fig. 12) and fan 13 therein, the shaft 14 of which is journaled in a frame 15 upstanding from the frame 1. This casing is adjustable to direct the blast by a link 16, arm 17, and shaft 18 mounted on the frame 15 and having a hand lever 19 (Fig. 1) in reach of the driver's seat 20. The delivery end of the casing 12 can be adjusted to the exact height desired, according to the length and condition of the grain, by the said lever, and will be so held by a friction screw 20' which bears on the shaft 18. This pneumatic device has important advantages over the usual reel, in that it is not so subject to breakage and can be adjusted to operate properly on the shortest grain, the blast being then directed to strike just above the cutter 3, and it does not shake out and cause the loss of grain berries as does a reel.

A draft means is furnished by a tongue 21 (Fig. 6) connected with the bottom frame elements of the machine, or a gasoline tractor may be used. The cut grain is received on a laterally traveling endless platform apron 22 mounted on rollers 23, 24 having their shafts journaled in a frame 25 supported in the frame 1 (Fig. 4). The inner roller 23 and the apron are actuated by a sprocket 26, chain 27, and sprocket 28 on the shaft 5. The inner end of the apron 22 delivers the grain in the open throat of an air tight air trunk 29 (Fig. 7) which extends up over the bull wheel and to the stack forming means so as to deliver the elevated grain thereto. The grain is elevated by an air blast from one or more fans, two of which are illustrated at 30 and 31, in casings 32, 33 and delivering air blasts to the trunk 29 by passages 34, 35. These fans are driven by pulleys 36, 37 and belts 38, 39 leading to pulleys 40, 41 on the shaft 7' (Fig. 4). The apron 22 enters within the bottom entrance throat of the trunk 29 and is enclosed thereby at a point beyond the air delivery of the casing 34, so that the grain straws can be properly acted on by said air as they are being delivered by the apron, and the lower part of the air trunk 29 is so arranged that the frame 25 may be tilted as hereinafter described. The trunk has a distributer 42 (Figs. 7, 13, 14) directed to deliver the elevated grain into the stack former device D, which is provided with cheek plates 43 pivoted to the sides of the distributer at 44. These cheek plates are connected by a longitudinal bar 45 pivoted to them at 45', so as to be swingable together to distribute the loose grain to the middle, front and rear of the stack former as may be required for the proper building of the stack, being pulled forward by a cord 46 and returned by a spring 47. The cord may be pulled by the driver at will or by suitable automatic mechanism. For the latter purpose the cord is shown as passing around sheaves 48, 49, 50 and attached to a slide 51 reciprocable in a fixed guide 52. 53 is an arm pivoted to the slide at 54 and having at its rear end a shoulder or hook 55 which is adapted to be engaged by a pin 56 (Fig. 11) carried by an adjustable member or hood 57. This hood can be clamped at any desired point on the circumference of the wheel 58 by a set screw 59'. The rotation of this wheel carries the pin 56 periodically into engagement with the shoulder 55, so as to draw the arm 53 rearwardly and swing the distributer elements 43 towards the front of the machine so that the grain will be delivered in the forward part of the stack former. As the pin 56 rotates rearward it carries the rear end of the arm 53 into contact with the top of a pin 59 (Fig. 5) so that the arm is arrested and disengaged from the pin 56, whereupon the spring 47 will instantly swing the said distributer elements rearward and draw the arm 53 back to its forward position. The repeated engagement of the pin 56 with the shoulder 55, and the action of the spring 47, will give to the distributer elements the desired operation. Several such pins 56, properly spaced apart, may be attached to the wheel 58 to increase the frequency of the operation of the distributer devices and obtain the desired distribution of the grain endwise of the stack former. The extent of the movement of the distributer can be regulated by adjusting the pin 59 so as to vary the time of the disengagement of the arm 53, which is accomplished by mounting the pin 59 on a slotted arm 60 and by clamping said arm to a suitable portion of the frame in the desired position, the arm being secured after adjustment either endwise or up or down by a clamping bolt 61 which passes through the slot of the arm.

Provision is also made for moving the distributer up and down and crosswise to the direction of travel and endwise of the stack former as may be required to distribute the grain from side to side of the stack former. It is pivotally supported on journals 62 and may be lifted by a roller 63 and returned by gravity. The said roller is carried by an arm 64 fixed on a rock shaft 65 having an arm 66. This arm is pulled to lift the roller 63 by a cord 67 which passes around sheaves 68 and 69 to a hand or foot lever 70. This lever is pivoted at 71 to the frame 1 and is guided and held adjusted by a rack 72. This rack is shown (Fig. 5) as having teeth or stops for the lever 70 adapted to hold it in three distributing positions to deliver the grain to the inner side, middle, or outer side of the stack former. The rack 72 has a downward extension 73 of its slot so that the lever can be depressed to elevate the distributer sufficiently to blow weeds entirely over the stack former and to the ground whenever the machine encounters patches of such weeds.

Figure 2:
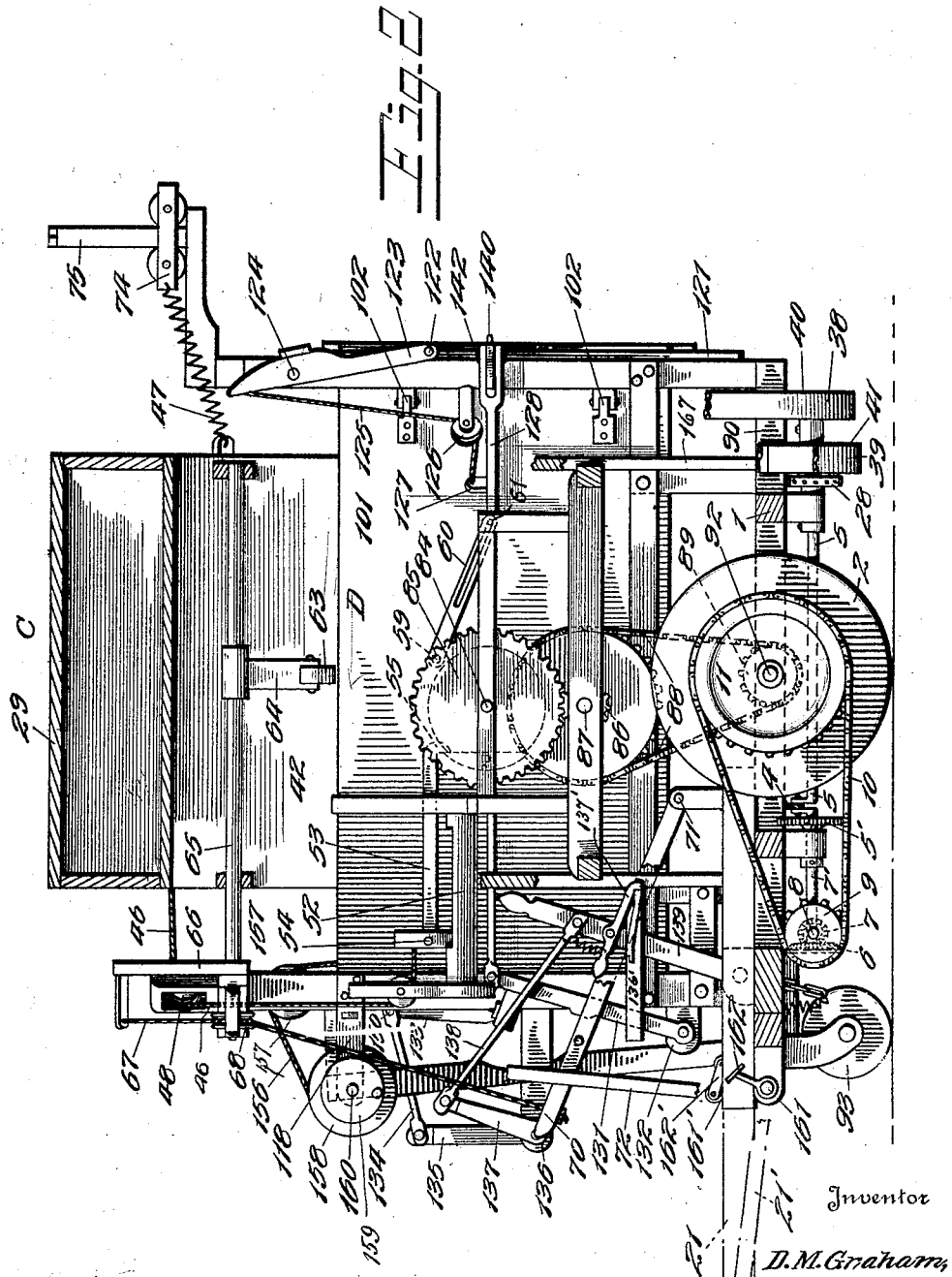
Fig. 2 is a longitudinal vertical section of the same on line II—II of Fig. 3.

The spring 47 may accommodate itself to the upward and downward movement of the distributer by being attached to the carriage 74 which can roll upward and downward on a fixed vertical guide 75 mounted on a suitable part of the frame of the machine (Fig. 2).

The fan 13 is rotated by the pulley 76, belt 77 and pulley 78 on the shaft 8.

To confine the loose grain on the platform 22, and also the air which is forced over the platform by the fan 13, said platform is or may be enclosed, as by a top wall 79, an end wall 80 and a rear wall 81 (Fig. 12), preferably of sheet metal, these parts being supported by the frame 15. The platform 22 may also have a bottom enclosure 81', a portion of which is shown in Fig. 7, extending to the trunk 29.

By the use of this pneumatic elevator and distributer I do away with the expensive and complicated mechanism and canvas belts, and the annoyance and loss of time due to their repeated adjustments, and am able to eject weeds the stacking and handling of which would be a loss and which would often by their green and wet condition heat and mould the grain if left in the stack. That is, by elevating the distributor sufficiently, weeds will be blown entirely over the stack former instead of being deposited therein.

The design is to lay and convey the grain straws substantially parallel with the line of draft until they are blown from the distributer. The fan 13 aids in this operation in first laying the straws in such parallel position with their heads at the rear of the apron 22. In such position they enter the lower end of the air trunk 29 and are forced upward therein by the fan 30. As they approach the upper end of the trunk the fan 31 promotes the delivery of the straw still in substantially the same position, to the distributer and out of the open end of the latter. As they are blown out the butts of the straws being lighter are forced in advance of the heads so that the general tendency is to drop the straws into the stack former against the ends and sides thereof in a more or less vertical position, butts downward.

In order to promote the parallel movement of the straws up through the trunk 29 I may provide for narrowing the front or rear side of the trunk so as to retard either the heads of the straws, or the butts, as may be required. This may be accomplished by a movable wall 82 mounted at the end of the long sides of the trunk and within the same, as shown in Fig. 15, this movable wall being tiltable on shaft 83 inclined along the wall of the trunk to which shaft the wall 82 is attached, and which is journaled near the upper and lower ends of the trunk. By adjusting this wall by turning said shaft the width of either the front or rear end of the trunk may be slightly enlarged or contracted, as required, and the shaft 83 is held in its adjusted position frictionally or by any suitable latch of known character.

The wheel 58 is rotated with a shaft 84, and large gear wheel 85, and by a pinion 86, shaft 87, chain 88, and sprocket 89 connected with the bull wheel.

90 is the base frame of the stack former suitably attached to the harvester base frame 1 and having at the outer side a ground wheel 91 mounted on an axle 92', which is attached on the under side of the frame 90 and which is or may be in line with the bull wheel axle, so that the main weight of the combined harvester and stack former is carried by the bull wheel and that of the stack former partly by said ground wheel. It should be noted that the design of the machine is such that the entire weight of the harvester frame 1 and parts supported thereby is carried by the bull wheel, there being no normally acting grain wheel at the outer end of said frame 1; and an equal balancing part of the weight of the stack former frame, and supported parts, and of the stack, is also carried by the bull wheel, giving it great driving power and none of this power is used up in running a binder. The weight at the stack former side somewhat over-balances that at the harvesting side, and this over-balancing part of the weight is carried by the ground wheel 91, excepting such as is carried by one or more front ground wheels 93 which are designed to take neck weight from the team and to hold up the front of the machine when it is not in use, and which are or may be mounted as caster wheels under the front part of the frame 90.

The harvester frame 25 is mounted on a transverse axis in the frame 1, so that the cutter can be run close to the ground in the case of short grain, or can be elevated to cut the grain at a high level and save the expense of handling and threshing an unnecessary amount of straw where the grain is tall. By its adjustment I can cut close to the ground when the grain is relatively ripe and dry so as to get the necessary length of straw and amount of sap for the increase and maturing of the grain berries while sweating in the stack; or can cut at a higher level to include a lesser length of the straws and less sap and moisture in the stack when the grain is less ripe, thereby avoiding undue sweating of the berries while they are in the stack. The frame 25 can be so adjusted without affecting the frames 1 and 90 or the draft frame 21 or other parts of the machine. The frame 1 is provided with a limiting slot or guide 94 (Fig. 6) for the shaft of the driving roller 23, and with a slot 95 through which works the pitman 4, and also with guiding brackets 96 for the inner end member of the pivoted frame 25. This axis may be arranged near the rear side of the platform frame 25 or at any preferred distance therefrom. As shown it is at about the middle of said frame, the inner journal for said axis being formed by the end of the bull wheel axle 92 and the outer journal being formed by a stud shaft 97 fixed or turning in the frame 1. The frame 25 is tilted as desired for adjusting the height of the cutter by a forwardly extending lever 97' attached to its inner end.

The entire base of the machine, comprising the frames 1 and 90, being one rigid structure and carried substantially by only two ground bearings on wheels 2 and 91, and the grain wheel being omitted, there is substantially no or relatively little side draft, and the draft frame or tongue 21 is made rigid with said base by braces 21' and is arranged preferably between said wheels 2 and 91 and near the line of the bull wheel 3, or at such point as to practically eliminate side draft. 98 is an emergency wheel mounted at the grain side of the machine on the frame 1 and conveniently on the stud shaft 97. This wheel is held normally out of contact with the ground and serves to reduce friction and side draft in case the grain side of the machine should encounter a mound or high bit of ground, but at other times it does not bear on the ground and normally carries no weight and causes no side draft.

The stack former frame comprises upright posts 99, one at each corner of the three-sided base frame 90 (Fig. 6), the latter being open at the rear for the discharge of the stack. Attached to the forward posts is a front wall 100, and side walls 101 and connected by hinges 102 with the rear posts so that they may be swung outward slightly at their front ends to release the stack for its discharge. These three walls may be of boards, sheet metal or lattice work, adapted to contain the front and sides of the stack of grain as it is built up.

The side walls are swung outward for a limited distance by links 103 arranged outside of the front wall 100 and pivotally connected at 104 with brackets 105 which are bolted to the inner sides of the front ends of the walls 101 (Fig. 16).

The pivots 104 in the brackets 105 pass from the inside to the outside of the stack former through a slot 106 in the front wall. This slot is formed by angle bars 107 which are bolted to the posts 99. The side walls are further controlled and guided and held from distortion by the weight of the stack by frames 108 which are bolted to the side walls at 109 and carry at their inner ends forward projections which work in the slot 106. These projections are preferably formed by rollers 110 fitting in the slot, washers 111 which engage the inner and outer faces of the angle bars, and bolts 112 which pass through said washers and rollers and through the inner ends of the frames 108. The pivots 104 may have similar rollers 110' and washers 111'. The links 103 are pivoted at 113 to the upper and lower arms of a lever 114 pivoted at 103' and the upper arm of said lever is connected by a bar 115 with a hand lever 116 which is pivoted at 117 to the stack former frame. The bar 115 passes through a fixed guide 118, and is formed with notches 119 which may engage the lower part of said guide so as to hold the side walls 101 in their inner or outer positions. The pivoted part of the lever 116 is formed with a slot 120 which enables the operator to slide the lever up and down a little to engage or disengage the bar 115 with or from the said guide. Before the formation of a stack the lever 116 is so operated as to draw the forward ends of the side walls 101 inward until they are nearer together than are the rear ends, and the interior of the stack former flares rearwardly. When said forward ends are released and the stack is deposited the side walls and parts of the stack former become, or may be, further and further away from the sides of the stack as the machine moves forward from the stack so as to deposit the stack in as perfect form as possible and without undue friction.

The rear of the stack former is closed while a stack is being formed by an upwardly and rearwardly swingable gate 121 which is hung at points below its top by pivots 122 (Fig. 9), so that the gate is partly or nearly balanced, said pivots being carried in swingable arms 123 which are pivoted at 124 to the rear posts 99. Ropes 125 attached to the upper ends of the arms 123 lead under sheaves 126 and forward to points of attachment at 127 to reciprocable rods 128, one at each side of the stack former. These rods are guided in slotted brackets 129 attached to bars 130, the latter being fixed to the posts 99 (Figs. 3 and 8). These rods are attached at their front ends to a yoke 131 pivotally mounted in bearings 132 attached to the front posts 99, are held rearward by spring 132', and are reciprocated to swing the gate 121 first bodily rearward and then upward, by an arm 133 attached to an upper cross bar of said yoke. This arm is operated by a link 134, arm 135, rock shaft 136, arm 137, link 138 and hand lever 139 near the seat 20. The lever 139 is guided in a slotted bracket 136' attached to a front corner post 99 and has a pivoted spring latch 137' adapted to engage projections 138' and 139' on said bracket. (Figs. 1, 2, 8 and 10.) Arms 140 pivoted at 141 to the rear posts 99 serve to hold the gate 121 from opening during the forming of a stack, and also to close the gate, and said arms are swung rearward to release the gate by the said rods 128 which are pivoted to the outer ends of the arms at 142 (Figs. 3 and 9). This upward swinging of the gate removes it out of the way of the bottom elements of the stack former as they are subsequently moved rearward. When the stack is discharged it pushes the end gate further rearward on its pivots 122, and the gate trails lightly on the top of the stack as the team moves forward, the gate being nearly balanced on its pivots 122, and is subsequently closed by a reverse movement of the parts above described, and is held closed for the building of another stack by the arms 140.

The rear part of the bottom of the stack former is composed of longitudinal rods 143 (Figs. 3 and 8) having eyes which embrace the axle 92', which rods are spaced apart thereon by loose sleeves 144, the rods being adapted to swing vertically. The forward part of the bottom is preferably composed of rods 145 which are fixed in short upstanding brackets 146, these brackets being attached to a movable frame 147, this frame being adapted to slide backwards and forward and to tilt on the endmost sleeves 144. The rear parts of the rods 145 are flexible so as to yield downwards to accommodate the discharging of the stack. The downward movement of the rods 143 is limited by a transverse member 148 of the frame 147, and they are lifted by this member when the frame tilts downward and forward. The rearward sliding of the frame is limited by a downwardly extending shoulder or stop 149 which is attached to its under side and is adapted to engage with the front part of the axle 92' or with the parts 143 or 144 mounted thereon. The said frame has pivotally connected therewith at 149' a forwardly extending arm 150 which extends through a slot 151 (Fig. 1) in the front wall 100 and serves to guide the frame in its return to its forward stack supporting position. 152 is a space former adapted to produce a ventilating air space in the base of the stack, and preferably formed of sheet metal bent into inverted U-form and suitably attached to the frame 147. The lower rear corner of this space former is beveled off as indicated at 153 so that it will withdraw readily from the stack and will not be bent out of shape by contact with the ground. The frame 147 is provided on its under side with inclined runners 154 which work on top of two of the sleeves 144 on the axle 92. The forward end of the frame is normally heavy enough to fall by gravity after the discharge of the stack, and the inclination of the runners is such that the frame will then slide forward to its normal position. I can employ also a spring 155 attached to the front end of the frame and to the frame 90 which will aid the forward return of the frame 147 in case the whole stacker should be inclined backwards by the formation of the ground. The said bottom frame is rearwardly tilted for the discharge of the stack by a rope 156 which is attached to the front end of the frame and runs over a sheave 157 to a drum 158, on which it may be wound up by the operator's turning a crank wheel 159 which is connected by a shaft 160 with the said drum.

161 is a rock shaft mounted at the front of the frame 90 and operable by a foot lever 162 to secure or release the frame 147 (Fig. 5). This rock shaft is connected by an arm 161' and a link 162' with a pivoted and swinging dog 163 which is adapted to hook over the front bar of said frame to hold it from rearward sliding. 164 is a sliding spring bolt which is adapted to extend over or be withdrawn from the said frame to hold it down or to permit it to tilt upward, and this bolt is connected by a link 165 with an arm 166 on the rock shaft 161.

The trunk 29 is made strong and stiff, especially by stout front and rear end boards 167, and is one of the weight sustaining frame elements of the machine. It is preferably arranged near the bull wheel and its upper end at said boards 167 is connected by front and rear inclined angle iron frame elements 168 (Fig. 19) with the outer end of the harvester base frame 1, and this connection may be through the medium of the frame 15 (Fig. 19). At the stack former side of said trunk, its upper end, preferably at the same points of attachment to the end boards 167, is connected with the base frame 90 of the stack former by front and rear inclined angle iron frame elements 169 (Fig. 1). At a sufficient distance above the base frame, horizontal frame elements 170, 171 (Fig. 19), at the front and rear of the trunk, connect it with the member 168 and frame 15, and with the member 169, respectively. 172 is an angle iron inclined frame member connecting the upper part of the trunk 29 with the outer part of the front of the stack former frame. The weight of the machine is thus largely concentrated on the bull wheel.

It will be understood that the throat at the lower end of the air passage 34 and at the lower end of the trunk 29, where the air blast takes hold of the grain on the inner end of the apron 22, may be modified as required for the best action of said air blast for the purpose of propelling the grain into and up the said trunk, and the showing in the drawings is to be considered as diagrammatic in this respect. The word grain as used herein is intended to include hay, straws and other crops adapted to be harvested by my machine.

In combination with the said frame and two-wheeled support (Fig. 19) for the harvesting, grain-carrying and grain stacking elements, a modification of the draft device may be employed (Fig. 20). In this construction the center or line of application of the draft may be shifted laterally at will, according to the average weight of the stack, or according to the varying weight of the same, or as may be required by the thickness and resistance of the grain, or by the softness of the ground which may affect the wheels 2 and 91 differently. 173 is a base frame member which may be attached to the frames 1 and 90 or may take the place of the front members thereof. 174 is a channel bar to which is attached the tongue 21 and braces 21' or other draft connection. 175 indicates rollers engaging in the channel of the bar 174 to hold the same to the member 173 and guide it in its lateral adjustment. The rollers are mounted on brackets 176 secured to the member 173, portions of which brackets may extend under the channel bar to hold it up. 177 is a rope or chain attached at its ends to the channel bar, passing around guiding pulleys 178 mounted on the member 173 and wound at its intermediate part on a drum 179. Said drum is suitably mounted, as on one of the brackets 176 and may be turned by an upwardly extending shaft 180 having a crank 181 within reach of the operator. By turning said crank the draft device may be shifted to correct side draft which may develop from any cause, only an occasional and small adjustment being ordinarily required, while the tongue remains rigid in horizontal planes with the harvester and stacker frame. The frame 147 is preferably provided with wheels 182 which may run on the ground at the time of the deposit of the stack.

What is claimed is:

1. In a harvesting machine, the combination of cutting apparatus, an endless apron for receiving and conveying the cut grain immediately from the cutting apparatus, and a pneumatic grain elevator having an air trunk elongated along said apron to which said grain is delivered by the apron.

2. In a harvesting machine, the combination of cutting apparatus, grain conveying means for receiving and carrying the cut grain, and a grain elevator comprising an air trunk to which the grain is delivered by said conveying means and which is elongated forwardly and rearwardly along said apron, a fan delivering an air blast to the lower part of said trunk, and a supplemental fan delivering an air blast to the upper part of said trunk.

3. In a harvesting machine, the combination of a frame, supporting and driving wheels, draft means, cutting and grain conveying mechanism on said frame, pneumatic means on said frame in advance of the cutting mechanism for inclining the grain to the cutting mechanism, pneumatic grain elevating means to which the cut grain is delivered by said conveying mechanism, and stack forming, transporting and depositing means to which the grain is delivered by said elevating means.

4. In an enclosed harvesting stack former adapted to receive grain for the formation and deposit of a stack, and having a wheeled supporting frame, means for increasing laterally the enclosed space capable of being occupied by parts of the stack, whereby the disengagement of the stack from the former is facilitated for the deposit of the stack, and means for depositing grain in said stack former before its enclosed space is so increased.

5. In a harvesting machine, the combination of a stack former, a pivotally hung and rearwardly swingable end gate, means for elevating said gate in vertical position for the deposit of the stack, a wheeled grain-cutting apparatus, and means for closing and securing said gate extending to the front of the stack former within reach of the operator of said cutting apparatus.

6. In a harvesting stack former, in combination with the containing walls, and means for causing the deposit of a stack therefrom, a nearly balanced end gate adapted to bear lightly on the stack as the same is deposited.

7. In a harvesting machine, grain transporting and delivering apparatus including a former for shaping and depositing a stack suitable for the curing of grain therein, said machine having means for depositing cut grain in said former, said depositing means being provided with devices operable at will to divert weeds, and filaments which are not to be collected away from said former so that they will not be deposited therein.

8. In a harvesting machine, the combination of grain transporting and delivering apparatus, a stack former, means for depositing cut grain in said stack former and pneumatic means adapted to operate on material which is on its way to the stack former and blow filaments which are not to be collected, clear of the stack former.

9. In a harvesting machine, the combination of grain transporting and delivering apparatus, a movable distributer therefor, a stack former for receiving grain from said distributer, pneumatic means delivering a blast into said distributer, and means for operating said distributer at will to blow filaments, not to be collected, clear of said stack former.

10. In a harvesting machine, the combination of a cutter platform having an endless apron, and a pneumatic grain elevating trunk the lower end of which encloses the delivery end of said apron, a longitudinally and vertically movable distributer at the upper part of said trunk, and a stack former into which the grain is distributed.

11. In a harvesting machine, the combination of cutting and grain transporting means, an air trunk leading upward therefrom, a fan for delivering an air blast into the lower part of said trunk, a movable grain distributer connected with the upper part of said trunk, a stack former into which said distributer is adapted to deliver, and means for delivering a supplemental air blast through said distributer.

12. In a harvesting machine, the combination of connected base frame elements, cutting and grain carrying means on one end of said frame elements and a stack former on the other end of the same, a bull wheel arranged near the middle of the machine, a ground wheel arranged under the stack former, said bull wheel supporting a part of the weight of the stack former, means for delivering cut grain to the stack former, and means whereby the weight of the harvester frame elements and mechanism including the outer end of the same is carried by the said bull wheel.

13. In a harvesting machine, the combination of connected base frame elements, cutting and grain carrying means on one end of said frame elements and a stack former on the other end of the same, a bull wheel arranged near the middle of the machine, a ground wheel arranged under the stack former, said bull wheel supporting a part of the weight of the stack former, means for delivering cut grain to the stack former, and inclined truss elements whereby the weight of the harvester frame elements and mechanism including the outer end of the same is carried by the said bull wheel.

14. In a harvesting machine, the combination of a harvester base frame, cutting and grain carrying means thereon, a stack former base frame connected with said harvester frame, a stack former thereon, a bull wheel supporting the inner end of the harvester frame, a ground wheel which together with said bull wheel supports said stack former frame, a grain elevator on said harvester frame having means for delivering grain to said stack former, frame elements connecting the outer end of the harvester frame with the elevator and supporting the outer end of the harvester frame above the ground, and frame elements connecting the stack former frame with the elevator.

15. In a harvesting machine, the combination of a base frame portion, cutting and grain receiving means thereon, a second base frame portion united on substantially the same level with the said first portion, a stack former frame on said second base frame portion, a grain elevator frame mounted on and upstanding from said first base frame portion at the inner part thereof, inclined truss members connecting the upper part of said elevator frame with the outer part of the first base frame portion and inclined truss members connecting the upper part of said elevator frame with the stack former frame portion.

16. A stack former for a harvesting machine, having at its bottom a rear portion which is vertically movable, and a separate forward portion which is longitudinally movable and vertically movable, and is provided with means for moving said rear portion, said two portions cooperating for the deposit of the stack, and means for actuating said forward portion, the same being combined with mechanism for depositing grain in said former before said portions are moved as described.

17. A stack former for a harvesting machine, having at its bottom a rear portion comprising longitudinal rods which are vertically movable, and a forward portion comprising longitudinal rods and which is longitudinally movable and vertically movable, said two portions cooperating for the deposit of the stack, and means for actuating said forward portion, the same being combined with mechanism for depositing grain in said former before said portions are moved as described.

18. A stack former for a harvesting machine, having at its bottom a rear portion comprising longitudinal rods which are vertically movable, and a forward portion comprising longitudinal rods and which is longitudinally movable and vertically movable, the forward portion having means for moving said rear portion, and said two portions cooperating for the deposit of the stack, and means for actuating said forward portion, the same being combined with mechanism for depositing grain in said former before said portions are moved as described.

19. A stack former having side walls, a front wall, an end gate and a bottom, the rear part of said bottom consisting of rearwardly extending stack-supporting rods pivoted at their forward ends and immovable rearwardly, and the front part of said bottom consisting of a frame which is rearwardly movable and downwardly tiltable, longitudinal stack-supporting rods carried by said frame above the said rearwardly extending rods, and means for tilting said frame, said frame having means for lifting said rearwardly extending rods.

20. A stack former for a harvesting machine, having at its bottom a transverse series of rearwardly extending rods, a transverse support on which said rods are individually pivoted at their forward ends, and means for tilting said rods in vertical planes, the same being combined with means for depositing cut grain in said stack former before said tilting of the rearwardly extending rods.

21. A stack former for a harvesting machine, having at its bottom a transverse series of rearwardly extending rods, a transverse support for said rods on which said rods are individually pivoted at their forward ends, means for loosely spacing said rods on their transverse support, and means for tilting said rods in vertical planes, the same being combined with means for depositing cut grain in said stack former before said tilting of the rearwardly extending rods.

22. A stack former for a harvesting machine, having at its bottom a supporting frame which is rearwardly slidable and downwardly tiltable, a support for said frame, inclined runners on said frame which work on said support and are adapted to cause the forward movement of said frame after the deposit of the stack, means for tilting said frame, and means for depositing cut grain in said stack former prior to said sliding of the bottom and tilting of said frame.

23. A stack former for a harvesting machine, having a rearwardly swingable end gate, and longitudinally reciprocable rods at the sides of the stack former having means for releasing and closing said end gate, and means for reciprocating said rods, the same being combined with means for depositing cut grain in said stack former prior to said operation of said rods and the release of said end gate.

24. A stack former for a harvesting machine, having a rearwardly swingable end gate, arms adapted to release and to close said gate, reciprocable rods at the sides of the stack former for actuating said arms, and means for reciprocating said arms, and combined therewith means for depositing cut grain in said stack former prior to the operation of said end gate.

25. In a harvesting machine, the combination of a stack former, and a distributer for delivering grain thereto, said distributer having elements movable sidewise of the stack former and elements movable endwise of the stack former, and means for so actuating said elements.

26. In a harvesting machine the combination of a harvester frame, and a stacker former frame united therewith, grain-cutting and carrying mechanism and stack-forming mechanism on said frames, a bull wheel near the middle of said frames, having operative connections with said cutting and carrying mechanism, a ground wheel under the stack former frame, said two wheels carrying the greater part of the weight of the machine and the outer end of the harvester frame being carried normally above and out of contact with the ground, and draft means at the front of said frames adjustable laterally thereof.

27. In a harvesting machine, the combination of connected base frame elements, cutting and grain carrying means on one end of said frame elements and a stack former on the other end of the same, a bull wheel arranged near the middle of the machine, a ground wheel arranged under the stack former, said bull wheel supporting a part of the weight of the stack former, means for delivering cut grain to the stack former, means whereby the weight of the harvester frame elements and mechanism including the outer end of the same is carried by the said bull wheel, and a laterally adjustable draft means connected with the frame elements.

In testimony whereof, I affix my signature, in presence of two witnesses.

DAVID M. GRAHAM.

Witnesses:
H. N. Low,
N. Curtis Lammond.